United States Patent Office 3,813,415
Patented May 28, 1974

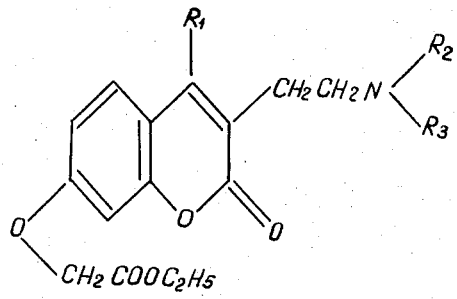
FORMULA 1
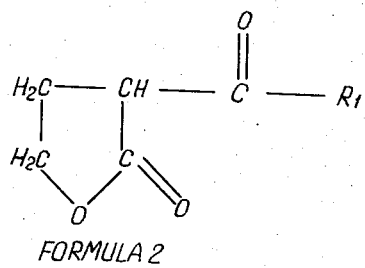
FORMULA 2
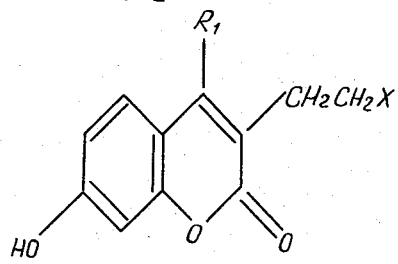
FORMULA 3
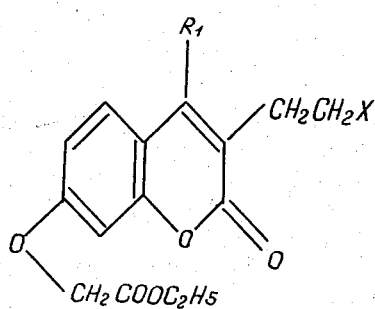
FORMULA 4
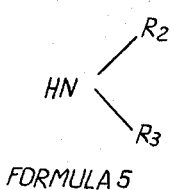
FORMULA 5

3,813,415
PROCESS FOR THE PREPARATION OF 3-(BETA DIALKYLAMINO-ETHYL)-4 - ALKYL-7-CARBOETHOXYMETHOXYCOUMARINS
Henryk Kycia and Danuta Chmielewska, Warsaw, Hanna Rolak, Zyrardow, Zbigniew Michno and Jan Zaniuk, Grodzisk Mazowiecki, Janusz Surgiewicz, Warsaw, Ferdynand Stefaniak, Grodzisk Mazowiecki, Przemyslaw Lenkowski, Milanowek, and Anna Kobosko, Grodzisk Mazowiecki, Poland, assignors to Grodziskie Zaklady Farmaceutyczne "Polfa" Przedsiebiorstwo Panstwowe
Filed July 28, 1972, Ser. No. 276,262
Int. Cl. C07d 7/26
U.S. Cl. 260—343.2 R          10 Claims

ABSTRACT OF THE DISCLOSURE

3 - (beta-dialkylaminoethyl) - 4-alkyl-7-carboethoxymethoxycoumarin of the formula:

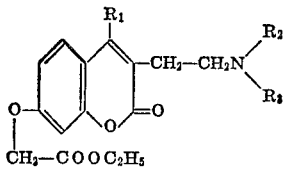

in which $R_1$, $R_2$ and $R_3$ stand for a lower alkyl group containing 1-3 carbon atoms and its hydrohalides.

The above-mentioned compounds proved to be drugs used in case of circulatory system diseases. The said compounds are produced in the reaction of resorcinol with a gamma-butyrolactone derivative of the formula:

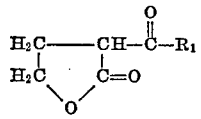

or by addition of a hydrogen halide in the presence of phosphorous acid ($P^{III}$) then the thus obtained 3-(beta-haloethyl-4-alkyl-7-hydroxycoumarin is subjected to reaction with a haloacetic acid ethyl ester in the presence of alkali metal carbonate and a catalytic quantity of diethylformamide or water and potassium iodide. The thus obtained 3-(beta-haloethyl)-4-alkyl-7-carboethoxymethoxycoumarin is subjected to reaction with a dialkylamine and the thus obtained product is isolated as a complex compound with zinc chloride and if necessary converted to the hydrohalide.

---

The invention relates to a process for the preparation of 3 - (beta-dialkylaminoethyl) - 4-alkyl-7-carboethoxymethoxycoumarins of the formula 1, in which $R_1$, $R_2$ and $R_3$ denote a lower alkyl group containing 1-3 carbon atoms, and of their hydrohalides. These compounds are known as drugs which are used in case of circulatory system diseases.

The known method of producing said compounds consists in the reaction of resorcinol with a gammabutyrolactone derivative and an aqueous hydrogen bromide solution in the medium of acetic acid at the temperature of 120° C. (British Pat. No. 1,044,608, second part of example 4), subjecting the thus produced 3-(beta-bromoethyl-4-alkyl-7-hydroxycoumarin to the reaction with a dialkylamine (British Pat. No. 1,067,626, and subjecting the thus produced 3 - (beta-dialkylaminoethyl)-4-alkyl-7-hydroxycoumarin to the reaction with a haloacetic acid ethyl ester (British Pat. No. 1,014,053).

According to British Patent Specification No. 1,044,608 the above-mentioned reaction of resorcinol with the gamma-butyrolactone derivative in the presence of hydrogen bromide occurs with a yield of scarcely 60%. In reality it is even difficult to obtain this yield, because under the above-mentioned conditions of the reaction the gamma-butyrolactone derivative is of low stability and in connection therewith a considerable quantity of tarry impurities is incidentally formed.

British Pat. No. 1,067,626 does not state with what a yield 3 - (beta-dialkylaminoethyl) - 4 - alkyl-7-hydroxycoumarin constituting the next stage of this synthesis, has been obtained; however, according to this specification, analogous coumarins monosubstituted at the nitrogen have been obtained with a yield of 50–60% only.

Finally, according to British Pat. No. 1,014,053, the final product of the synthesis i.e. 3-(beta-dialkylaminoethyl)-4-alkyl-7-carboethoxymethoxycoumarin hydrochloride has been obtained with a yield of 63%. The melting point of, for instance, 3 - (beta-diethylaminoethyl) -4- methyl - 7 - cahboethoxymethoxycoumarin hydrochloride was only 159–160° C. and according to our experiments this product always contains traces of free non-etherized 3-(beta-diethylaminoethyl)-4-methyl-7-hydroxycoumarin which traces can easily be detected, e.g. with the aid of thin-layer chromatography. The total yield of 3 - (beta-dialkylaminoethyl) - 4-alkyl-7-carboethoxymethoxycoumarin hydrochloride in relation to the gamma-butyrolactone derivative according to our method amounts to no more than 19–23%.

It has unexpectedly been found that the above-mentioned reaction of resorcinol with the gamma-butyrolactone derivative and hydrogen bromide can be increased to a yield approaching the theoretical one by carrying to the reaction in an anhydrous medium and in the presence of phosphorous acid ($P^{III}$).

It has also been found that 3-(beta-haloethyl)-4-alkyl-7-hydroxycoumarin, obtained as a result of the reaction of resorcinol with the gamma-butyro-lactone derivative and hydrogen halide, can be converted with high yield into 3 - (beta-dialkylaminoethyl)-4-alkyl-7-carboethoxymethoxycoumarin, by subjecting it at first to the reaction with a halo acetic acid ethyl ester, whereupon the produced 3 - (beta-haloethyl)-4-alkyl-7-carboethoxymethoxycoumarin is subjected to reaction with an excess of a dialkylamine.

It has also unexpectedly been found that under the reaction conditions the excess of dialkylamine does not form any amide with the ester group of the product, as seems to result from British Pat. No. 1,014,053.

The produced 3 - (beta-dialkylaminoethyl)-4-alkyl-7-carboethoxymethoxycoumarin is then isolated in the form of a hitherto unknown very sparingly soluble complex with zinc chloride from which the final product of high purity is obtained. The melting point of the thus obtained product, e.g. 3 - (beta-diethylaminoethyl) - 4 - methyl-7-carboethoxymethoxycoumarin hydrochloride is 160–162° C.

The total yield of the 3 - (beta-dialkylaminoethyl)-4-alkyl - 7 - carboethoxymethoxycoumarin hydrohalide obtained according to the invention, in relation to the gamma-butyrolactone derivative amounts to about 75%.

According to the invention, resorcinol is subjected to simultaneous reaction with the gamma-butyrolactone derivative of formula 2 in which $R_1$ has the meaning as stated above, and with a hydrogen halide in an anhydrous medium of a lower aliphatic acid and phosphorous acid ($P^{III}$), the obtained 3-(beta-haloethyl)-4-alkyl-7-hydroxycoumarin of formula 3, in which $R_1$ has the meaning as stated above, and X denotes a chlorine or bromine atom, is subject to reaction with a haloacetic acid ethyl ester of the formula $XCH_2CH_2COOC_2H_5$, in which X denotes a chlorine or bromine atom, in the medium of acetone in the presence of an alkali metal carbonate and a catalyst. The produced 3-(beta-haloethyl)-4-alkyl-7- carboethoxymethoxycoumarin of formula 4, in which $R_1$ and X have the meaning as stated above, is subjected to reaction with an excess of a dialkylamine of formula 5, in which $R_2$ and $R_3$ have the meaning as stated above, in the presence of a hydrogen halide acceptor and in the medium of benzene or toluene, whereupon the reaction mixture is washed with water, the solvent is evaporated, the remainder is dissolved in ethanol, the solution is treated with anhydrous zinc chloride, the mixture with the precipitated sediment of the complex compound is cooled, the sediment is separated, the complex compound is decomposed by means of an aqueous alkali metal carbonate solution or ammonia, and the liberated product is isolated and, if necessary, converted into the hydrohalide in a known manner.

In the reaction of resorcinol with the gamma-butyrolactone derivative, as the lower aliphatic acid one uses advantageously ice-cold acetic acid. The reaction is carried out at elevated temperature, preferably at the boiling temperature of the reaction mixture. Under such temperature conditions the yield of the reaction is slight.

It has unexpectedly been found that the presence of phosphorous acid ($P^{III}$) enables the reaction to proceed nearly quantitatively. Instead of using anhydrous phosphorous acid and hydroden halide, it is possible to produce both these raw materials immediately before the reaction, by the action of a halogen upon a suspension of red phosphorus in a lower aliphatic acid in the presence of a stoichiometric amount of water. It is also possible to subject a phosphorous trihalide solution to hydrolysis in a lower aliphatic acid by means of a stoichiometric amount of water.

To the thus prepared phosphorous acid solution and hydrogen halide in a lower aliphatic acid, resorcinol is added, the mixture is cooled down to a temperature of about 10° C. and the gamma-butyrolactone derivative is slowly added. Then the reaction mixture is heated up to the termination of the reaction and the produced 3-(beta-haloethyl)-4-alkyl-7-hydroxycoumarin is isolated by adding water.

The reaction of 3-(beta-haloethyl)-4-alkyl-7-hydroxycoumarin with the haloacetic acid ethyl ester in the presence of an alkali metal carbonate may be conducted in any organic solvent inert to the reaction, but in acetone the reaction proceeds most advantageously.

It has been found that of essential importance to the yield of the process is the presence in the reaction mixture of 0.2–2% of a catalyst which is N,N-dimethyl formamide or water and potassium iodide. The use of potassium iodide is unnecessary if the reaction is carried out with ethyl bromoacetate. The reaction is carried out at elevated temperature, advantageously at the boiling temperature of the reaction mixture, whereupon the product is separated by adding water.

The reaction of 3-(beta-haloethyl)-4-alkyl-7-carboethoxymethoxycoumarin with a dialkyl amine is advantageously conducted using a small dialkylamine excess, in a molar ratio of 1:1.2–2. As the hydrogen halide acceptor pyridine or an alkali metal carbonate is used. This reaction is conducted at elevated temperature, advantageously at the boiling temperature of the reaction mixture. After the insoluble impurities are washed away with water, the product is separated from the solution by evaporation of the solvent, whereupon it is cleared of remaining soluble impurities by dissolving in ethanol and selective precipitation of the product by means of anhydrous zinc chloride in the form of a very sparingly soluble complex compound. This compound arises by adding 1 molecule of zinc chloride to 1 molecule of a compound of the general formula 1, in which $R_1$, $R_2$ and $R_3$ have the meaning stated above. This is a new compound which up to now has not yet been described in the literature.

The isolated complex compound is then decomposed by means of an aqueous alkaline solution such as the aqueous solution of an alkali metal carbonate or ammonia. The liberated insoluble product is isolated, e.g. by filtering off, then it is washed with water and subsequently it is converted, if necessary, into a convenient hydrohalide.

EXAMPLE I

To a suspension of 9.5 parts by weight of red phosphorus and 182 parts by weight of acetic acid, 10.4 parts of water were added, whereupon 52.4 parts by weight of bromine were added dropwise within about 1 hour at room temperature with continuous stirring. The reaction mass was stirred for half an hour and the phosphorus excess was filtered off. To the obtained filtrate being an about 25% hydrogen bromide solution in acetic acid and containing phosphorous acid in a molar ratio to hydrogen bromide of 1:3, 11 parts by weight of resorcinol were added, whereupon the solution was cooled down to a temperature of 10° C. and 10.9 parts by weight of alpha-acetyl-gamma-butyrolactone were added dropwise with the aid of a dropper. The reaction mixture was heated for 2 hours at the boiling temperature, then it was cooled down to room temperature and while continuously stirring, 553 parts by weight of water were added dropwise. There was formed a pale yellow crystalline product which was filtered off and washed with water to a pH value of 7. There were obtained 22.6 parts by weight of 3-(beta-bromoethyl)-4-methyl-7-hydroxycoumarin having a melting point of 177–180° C. which is 96% of the theoretical yield calculated for alpha-acetyl-gamma-butyrolactone.

22.6 parts by weight of 3-(beta-bromoethyl)-4-methyl-7-hydroxycoumarin were dissolved at boiling temperature in 76 parts by weight of acetone containing 0.5% of water, then 2 parts by weight of active carbon were added and the mixture was stirred at boiling temperature for 15 minutes. Then the carbon was filtered off hot. The filtrate was heated to the boiling temperature, 23.7 parts by weight of anhydrous potassium carbonate were added and the mixture was heated at boiling temperature for about 10 minutes, whereafter 0.03 part by weight of potassium iodide and 14.4 parts by weight of ethyl chloroacetate were added. The mixture was heated at the boiling temperature for 10 minutes and then it was cooled down to room temperature and the product was precipitated by adding 393 parts by weight of water. The precipitated deposit was filtered off and washed with water to a pH value of 7. 28.7 parts by weight of 3-(beta-bromoethyl)-4-methyl-7 - carboethoxymethoxycoumarin having a melting point of 118–120° C. were obtained, which constitutes 98% of the theoretical yield calculated for 3-(beta-bromoethyl)-4-methyl-7-hydroxycoumarin.

28.7 parts by weight of 3-(beta-bromoethyl)-4-methyl-7-carboethoxymethoxycoumarin were suspended in 100 parts by weight of benzene, 13 parts by weight of anhydrous potassium carbonate and 10 parts by weight of diethylamine were added, the mixture was heated for 5 hours at the boiling temperature, then it was cooled down and washed with two water portions 25 ml. each. The benzene layer was evaporated to dryness under reduced pressure. After distillation the residue was dissolved in 120 parts by weight of ethanol and a solution of 15.2 parts by weight of anhydrous zinc chloride in 117 parts by weight of ethanol was added. The deposit of the zinc chloride complex compound precipitated with 3(beta-diethylaminoethyl)-4-methyl - 7 - carboethoxymethoxycoumarin which deposit was filtered off after the mixture has been cooled down to a temperature of 0° C.

The complex compound was decomposed by means of an aqueous potassium carbonate solution in the presence of 100 parts by weight of benzene. The benzene layer containing 3-(beta-diethylaminoethyl)-4-methyl-7-carboethoxymethoxycoumarin was distilled off to dryness. The residue was dissolved in ethyl acetate and the solution was saturated with gaseous hydrogen chloride. 25.5 parts by weight of 3-(beta-diethylaminoethyl)-4-methyl-7-carboethoxymethoxycoumarin hydrochloride precipitated in the form of a white deposit having a melting point of 161–162° C.

EXAMPLE II 22.6 parts by weight of 3-(beta-bromoethyl)-4-methyl-7-hydroxycoumarin obtained according to Example I were dissolved hot in 80 parts by weight of acetone, 24 parts by weight of anhydrous potassium carbonate were added and the mixture was heated at the boiling temperature for 10 minutes. Thereafter 0.5 part by weight of N,N-dimethyl formamide and 16 parts by weight of ethyl bromoacetate were added, whereupon the mixture was heated at the boiling temperature for 1 hour. There was obtained 3-(beta-bromoethyl)-4-methyl - 7 - carboethoxymethoxycoumarin which was not separated from the reaction mixture but was immediately subjected to reaction with 10 parts by weight of diethylamine in 100 parts by weight of toluene and with the addition of 9 parts by weight of pyridine by heating the mixture for 2 hours at the boiling temperature.

Subsequently the solution was washed with water and the toluene layer was concentrated to dryness at reduced pressure. The remainder was dissolved in 120 parts by weight of ethanol and a solution of 15.2 parts by weight of anhydrous zinc chloride in 117 parts by weight of ethanol was added. The mixture was saturated with gaseous hydrogen chloride at room temperature. After cooling down to a temperature of 0° C. the deposit of the zinc chloride complex compound with 3-(beta-diethylaminoethyl)-4-methyl - 7 - carboethoxymethoxycoumarin was filtered off and then the complex was decomposed by means of an ammonia water solution to 3-(beta-diethylaminoethyl)-4 - methyl - 7 - carboethoxymethoxycoumarin. The deposit was filtered off and dried. The dry deposit was dissolved in ethyl acetate and the solution was saturated with gaseous hydrogen chloride. 25 parts by weight of 3-(beta-diethylaminoethyl)-4-methyl-7-carboethoxymethoxycoumarin hydrochloride precipitated in the form of a white deposit having a melting point of 160–162° C.

The chemical constitution of the compound was confirmed by the results of elementary analysis as well as by NMR and infra-red spectrum diagrams.

What is claimed is:

1. A process for the preparation of 3-(beta-dialkylaminoethyl) - 4 - alkyl-7-carboethoxymethoxycoumarin of the formula

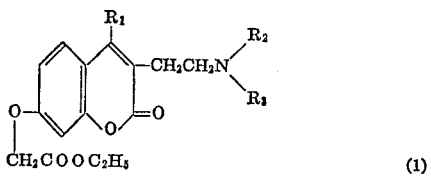

(1)

in which each of $R_1$, $R_2$ and $R_3$ is lower alkyl containing 1–3 carbon atoms, comprising reacting resorcinol with a gamma-butyrolactone derivative of the formula

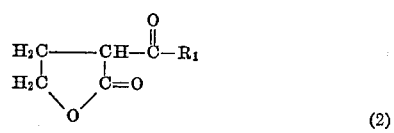

(2)

in which $R_1$ has the same meaning as defined above, and with a hydrogen halide in an anhydrous medium of a lower alkanoic acid and phosphorous acid ($P^{III}$), to form a 3-(beta-haloethyl)-4-alkyl-7-hydroxycoumarin of the formula

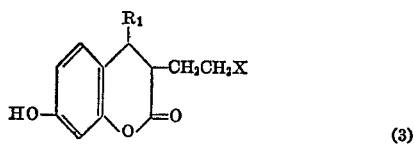

(3)

in which $R_1$ has the same meaning as defined above, and X is a halogen atom, reacting said compound of formula (3) with a haloacetic acid ethyl ester in the medium of acetone in the presence of an alkali metal carbonate and a catalyst, to form a 3-(beta-haloethyl)-4-alkyl-7-carboethoxymethoxycoumarin of the formula

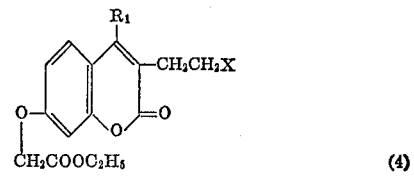

(4)

in which $R_1$ and X have the same meaning as defined above, reacting said compound of formula (4) with an excess of a dialkylamine of the formula

(5)

in which $R_2$ and $R_3$ have the same meaning as defined above, in the presence of a hydrogen halide acceptor in the medium of a solvent selected from the group consisting of benzene and toluene, washing the reaction mixture with water, evaporating the solvent, dissolving the residue in ethanol, treating the alcohol solution with anhydrous zinc chloride, cooling the zinc chloride-containing mixture to precipitate a zinc chloride complex compound, separating the precipitate, decomposing the complex compound with a base selected from the group consisting of an alkali metal carbonate and ammonia, and isolating the liberated product.

2. A process according to claim 1, wherein the phosphorous acid ($P^{III}$) and the hydrogen halide are produced immediately before the reaction by reacting a halogen with a phosphorus suspension in a lower alkanoic acid in the presence of a stoichiometric amount of water.

3. A process according to claim 1, wherein the phosphorous acid ($P^{III}$) and hydrogen halide are produced immediately before the reaction by subjecting the phosphorus trihalide solution to hydrolysis in a lower alkanoic acid with the aid of a stoichiometric amount of water.

4. A process according to claim 1, wherein the lower alkanoic acid is acetic acid.

5. A process according to claim 1, wherein the reaction of resorcinol with the gamma-butyrolactone derivative and hydrogen halide is conducted at elevated temperature, and the product is isolated from the reaction mixture by means of water.

6. A process according to claim 1, wherein in the reaction of 3-(beta-haloethyl) - 4 - alkyl-7-hydroxycoumarin with the haloacetic acid ethyl ester, the catalyst is selected from the group consisting of 0.2–2% of N,N-dimethylformamide and 0.2–2% of an aqueous solution of potassium iodide.

7. A process according to claim 1, wherein the reaction of 3-(beta-haloethyl)-4-alkyl - 7 - carboethoxymethoxycoumarin with the dialkylamine is conducted at a molar ratio of 1–1.2:2.

8. A process according to claim 1, wherein the hydrogen halide acceptor is a compound selected from the group consisting of pyridine and an alkali metal carbonate.

9. A process according to claim 1, wherein the reaction of 3-(beta-haloethyl)-4-alkyl - 7 - carboethoxymethoxycoumarin with the dialkylamine is conducted at elevated temperature.

10. A process according to claim 1 wherein the final product is converted to its hydrohalide salt by reacting the product with a hydrogen halide.

References Cited
UNITED STATES PATENTS 3,639,427   2/1972   Razdan et al. ____ 260—343.2 X JOHN M. FORD, Primary Examiner U.S. Cl. X.R.

424—279